United States Patent
Capps, Jr. et al.

(10) Patent No.: US 10,025,590 B2
(45) Date of Patent: *Jul. 17, 2018

(54) MULTICORE PROCESSOR AND METHOD OF USE THAT CONFIGURES CORE FUNCTIONS BASED ON EXECUTING INSTRUCTIONS

(71) Applicant: International Business Machines Corporation, Armonk, NY (US)

(72) Inventors: Louis B. Capps, Jr., Georgetown, TX (US); Ronald E. Newhart, Essex Junction, VT (US); Thomas E. Cook, Essex Junction, VT (US); Robert H. Bell, Jr., Austin, TX (US); Michael J. Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,764

(22) Filed: Nov. 23, 2016

(65) Prior Publication Data

US 2017/0075690 A1 Mar. 16, 2017

Related U.S. Application Data

(63) Continuation of application No. 12/335,696, filed on Dec. 16, 2008, now Pat. No. 9,507,640.

(51) Int. Cl.
*G06F 9/46* (2006.01)
*G06F 9/30* (2018.01)
(Continued)

(52) U.S. Cl.
CPC ...... *G06F 9/30145* (2013.01); *G06F 9/30021* (2013.01); *G06F 9/3802* (2013.01);
(Continued)

(58) Field of Classification Search
None
See application file for complete search history.

(56) References Cited

U.S. PATENT DOCUMENTS 4,638,427 A * 1/1987 Martin ................. G06F 9/5033
703/23
6,086,628 A 7/2000 Dave et al.
(Continued)

OTHER PUBLICATIONS

David Patterson et al., Computer Architecture: A Quantitative Approach, Morgan Kaufmann Publishers, Inc., Second Edition, 1996, pp. 187-190 and 400-404.

*Primary Examiner* — George Giroux
(74) *Attorney, Agent, or Firm* — Terrile, Cannatti & Chambers, LLP; Stephen A. Terrile

(57) ABSTRACT

A multiprocessor system having plural heterogeneous processing units schedules instruction sets for execution on a selected of the processing units by matching workload processing characteristics of processing units and the instruction sets. To establish an instruction set's processing characteristics, the homogeneous instruction set is executed on each of the plural processing units with one or more performance metrics tracked at each of the processing units to determine which processing unit most efficiently executes the instruction set. Instruction set workload processing characteristics are stored for reference in scheduling subsequent execution of the instruction set.

11 Claims, 3 Drawing Sheets

(51) Int. Cl.
*G06F 11/34* (2006.01)
*G06F 9/50* (2006.01)
*G06F 9/38* (2018.01)
*G06F 11/30* (2006.01)
*G06F 15/80* (2006.01)

(52) U.S. Cl.
CPC ........ *G06F 9/5044* (2013.01); *G06F 11/3024* (2013.01); *G06F 11/3409* (2013.01); *G06F 15/80* (2013.01); *G06F 2209/501* (2013.01)

(56) References Cited

U.S. PATENT DOCUMENTS

| | | |
|---|---|---|
| 6,513,057 B1 | 1/2003 | McCrory |
| 6,757,730 B1 | 8/2004 | Lee et al. |
| 6,904,594 B1 | 6/2005 | Berry et al. |
| 7,093,147 B2 | 8/2006 | Farkas et al. |
| 7,159,221 B1 | 1/2007 | Willen et al. |
| 2002/0184291 A1 | 12/2002 | Hogenauer |
| 2005/0013705 A1 | 1/2005 | Farkas et al. |
| 2006/0101306 A1* | 5/2006 | Needham ............ G06F 11/1658 714/11 |
| 2006/0136878 A1 | 6/2006 | Raghunath et al. |
| 2006/0168571 A1 | 7/2006 | Ghiasi et al. |
| 2009/0165007 A1 | 6/2009 | Aghajanyan |
| 2009/0320031 A1 | 12/2009 | Song |

* cited by examiner

MULTICORE PROCESSOR AND METHOD OF USE THAT CONFIGURES CORE FUNCTIONS BASED ON EXECUTING INSTRUCTIONS

BACKGROUND OF THE INVENTION

Field of the Invention

The present invention relates to processing information and more particularly to multi-core processing that adjusts core functions based on the performance of executing instructions at the cores.

Description of the Related Art

Computer systems that use more than one central processing unit (CPU) are typically built with identical CPUs. The CPUs may operate at different frequencies but they are essentially identical devices.

Multi-processor computer systems typically execute multiple applications and system software that have varying degrees of computational needs. For example, operating system software and some integer workloads like mcf from the SPECint CPU2006 generally spend most of their time moving data. In contrast, computationally intensive applications like the SPECfp CPU2006 and STREAM programs spend most of their time executing floating point operations. Computational needs vary considerably across workloads. General purpose processors, like those typically found in workstations and servers, are good at handling such a variety of applications but not optimal at all or even any more specific tasks. General purpose processors are designed to incorporate characteristics that are best matched for the general market. When an application set is very limited, task-specific processors and coprocessors are typically used instead of general purpose processors. Some examples of functions that use task-specific processors include video, crypto and vector functions.

Using identical homogeneous general purpose processors in a multi-processor computer system tends to simplify the computer system design while maintaining flexibility to handle a variety of tasks. However, the general purpose processors will not typically provide optimal performance per Watt of power because of performance tradeoffs made to achieve more general flexibility. In addition, process technologies often build different performance/power results on different cores in an integrated circuit having multiple processors due to process variations. The process variations can cause the entire multi-core processor to run at a lowest common denominator for performance and power.

SUMMARY OF THE INVENTION

In accordance with the present invention, a multiprocessor system with multiple general purpose processing units tuned for heterogeneous workloads allows an application to execute on any one of plural of the processing units but run best when scheduled on a processing unit having matching workload characteristics. Workload characteristics are determined, in part, by executing homogeneous instruction sets on the heterogeneous processing units and monitoring performance metrics at each processing unit.

This invention describes a method and apparatus for scheduling workloads across plural heterogeneous processing units by analyzing workload characteristics to assign the workload to processing units having similar characteristics. A continuous cycle of sensing an application's processing needs and scheduling application threads to "best fit" processing units allows multi-processor systems that have lower power processors capable of executing executions with reduced demand on the processing units. Since not allow processing units need to have extremely high performance, more processing units can populate a system thereby increasing the processing density of the overall system to provide improved throughput for the same power and system footprint. In addition, since simplified processing units with specific strengths are less complex to design and build, contain less interlocks and use less power per function, the development process is shortened and made less costly. Given the variety of core performance in an integrated circuit multi-processor due to process variations, fewer cores would have to be disabled or dialed down to the lowest-common denominator core performance.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
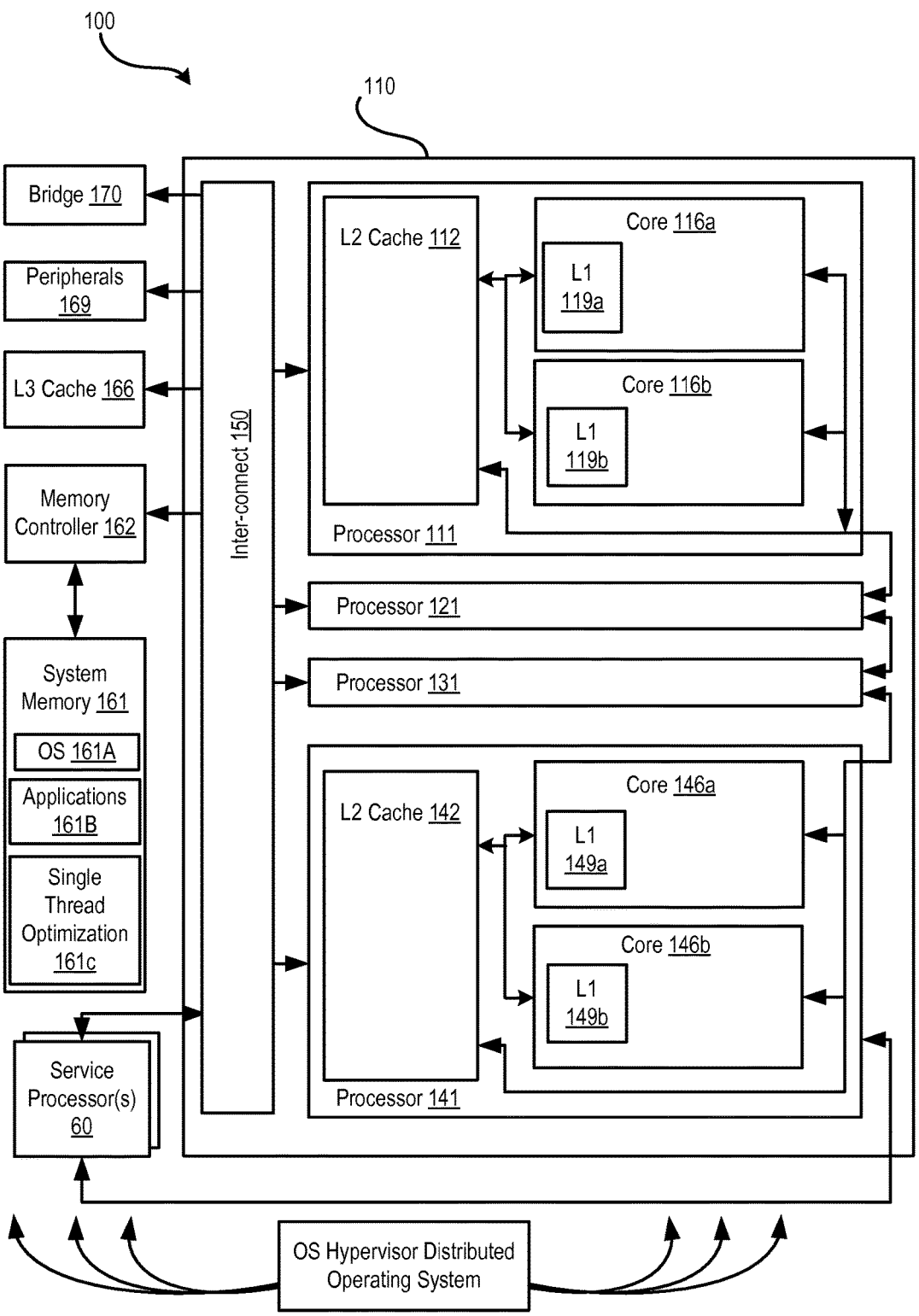
FIG. 1 shows a multi-processor computer architecture in which selected embodiments of the present invention may be implemented.

Referring now to FIG. 1, there is illustrated a high-level block diagram of a multiprocessor (MP) data processing system 100 that provides improved execution of single thread programs in accordance with selected embodiments of the present invention. The data processing system 100 has one or more processing units arranged in one or more processor groups, and as depicted, includes four processing units 111, 121, 131, 141 in processor group 110. In a symmetric multi-processor (SMP) embodiment, all of the processing units 111, 121, 131, 141 are generally identical, that is, they all use a common set or subset of instructions and protocols to operate, and generally have the same architecture. As shown with processing unit 111, each processing unit may include one or more processor cores 116a, 116b which carry out program instructions in order to operate the computer. An exemplary processing unit would be the POWER5™ processor marketed by International Business Machines Corporation that comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 116a, 116b includes an on-board (L1) cache memory 119a, 119b (typically, separate instruction and data caches) that is constructed from high-speed memory devices. Caches are commonly used to temporarily store values that might be repeatedly accessed by a processor, in order to speed up processing by avoiding the longer step of loading the values from system memory 161. A processing unit can include another cache such as a second level (L2) cache 112 which, along with a cache memory controller (not shown), supports both of the L1 caches 119a, 119b that are respectively part of cores 116a and 116b. Additional cache levels may be provided, such as an L3 cache 166 which is accessible via fabric bus 150. Each cache level, from highest (L1) to lowest (L3) can successively store more information, but at a longer access penalty. For example, the on-board L1 caches (e.g., 119a) in the processor cores (e.g., 116a) might have a storage capacity of 128 kilobytes of memory, L2 cache 112 might have a storage capacity of 4 megabytes, and L3 cache 166 might have a storage capacity of 132 megabytes. To facilitate repair/replacement of defective processing unit components, each processing unit 111, 121, 131, 141 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 150. Fabric bus 150 is connected to one or more service processors 160, a system memory device 161, a memory controller 162, a shared or L3 system cache 166, and/or various peripheral devices 169. A processor bridge 170 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads.

The system memory device 161 (random access memory or RAM) stores program instructions and operand data used by the processing units, in a volatile (temporary) state, including the operating system 161A and application programs 161B. Single thread optimization module 161C may be stored in the system memory in any desired form, such as an operating system module, Hypervisor component, etc, and is used to optimize the execution of a single threaded program across multiple cores of the processor units. Although illustrated, as a facility within system memory, those skilled in the art will appreciate that single thread optimization module 161C may alternatively be implemented within another component of data processing system 100. The single thread optimization module 161C is implemented as executable instructions, code and/or control logic including programmable registers which is operative to check performance monitor information for codes running on the system 100, to assign priority values to the code using predetermined policies, and to tag each instruction with its assigned priority value so that the priority value is distributed across the system 100 with the instruction, as described more fully below.

Figure 2:
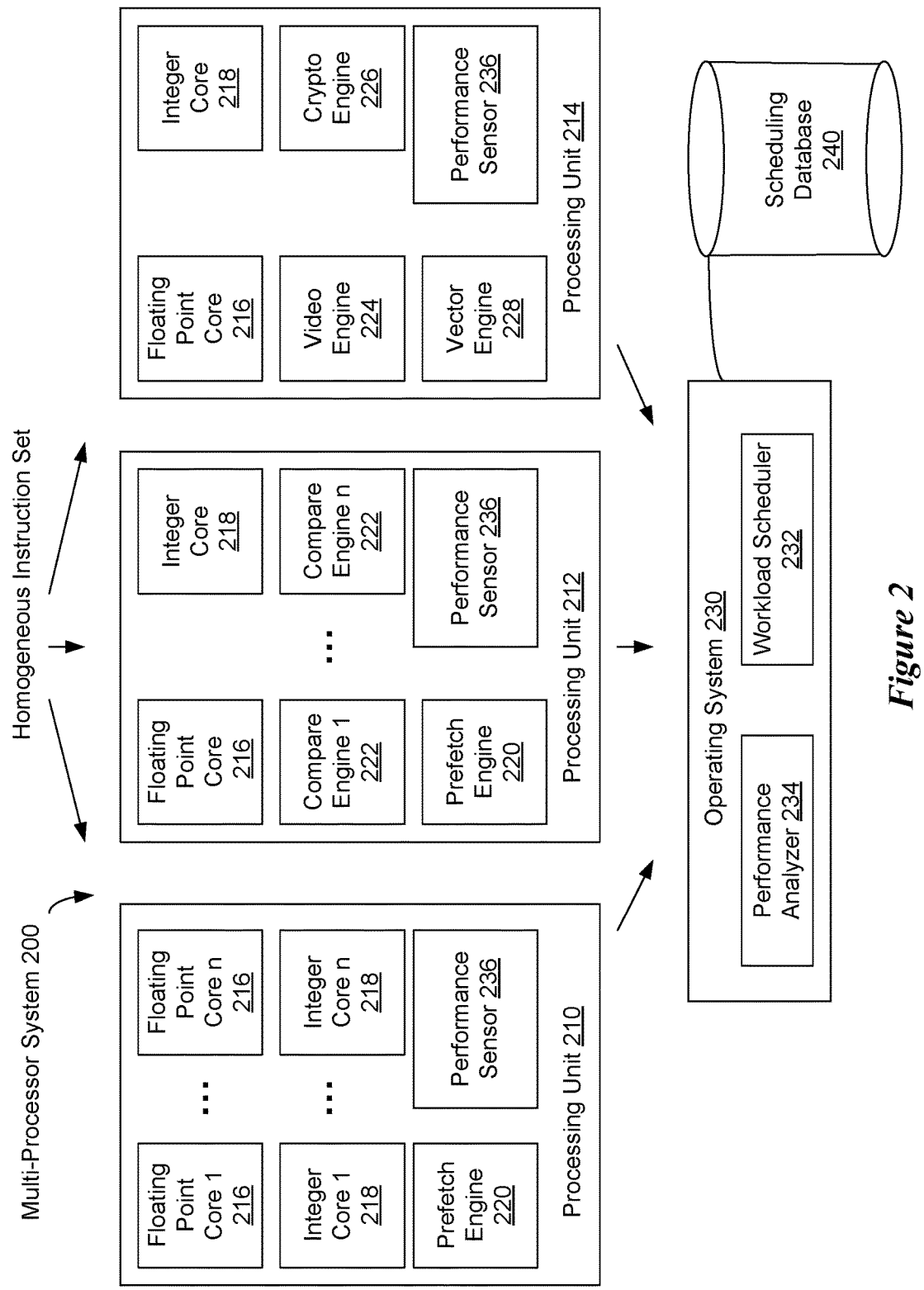
FIG. 2 shows a multi-processor system having heterogeneous processing units in which selected embodiments of the present invention may be implemented.

Referring now to FIG. 2, a block diagram depicts a multi-processor system having plural heterogeneous processing units 210, 212 and 214. Each of processing units 210, 212 and 214 has a general purpose design that runs common instruction sets, however each processing unit 210, 212 and 214 has heterogeneous characteristics that provide varying performances for a given instruction set depending upon similarities and differences of the processing unit and instruction set processing characteristics. By leveraging a synergistic hardware and software design, heterogeneous general purpose processing units execute a homogeneous instruction set so that automated performance sensing associated with each processing unit determines which processing unit most efficiently executes the instruction set. With the processing units running identical instruction sets, workload scheduling focused on the performance of the threads executing on the processing units determines how and when threads are best executed on a particular processing unit.

FIG. 2 depicts a multi-processor system having at least three processing units 210, 212 and 214, with each having heterogeneous workload processing characteristics represented by differing proportions of physical hardware logic. For example, processing unit 210 has a plurality of floating point cores 216 and integer cores 218 that more efficiently execute computationally intensive instructions, such as are found in applications having tight loops of integer or floating point operations. Processing unit 210 has other logic, such as a prefetch engine 220, that enable general purpose processing functions, however, the disproportionately greater number of floating point cores 216 and integer cores 218 allow processing unit 210 to more efficiently execute instruction sets that are computationally intensive, like those found in SPEC CPU2006 workloads. By comparison, processing unit 212 has a single floating point core 216 and a single integer core 218 to support general purposed processing, but multiple compare engines 222 and prefetch engines 224 that more efficiently execute branch operations. For example, operating system applications that benefit from special prefetching algorithms and high performance compare instructions will run more efficiently on processing unit 212 due to its disproportionately greater number of compare engines 222 and prefetch engines 220 relative to processing unit 210. Processing unit 214 also includes functional elements for performing general purpose computing instructions, such as a floating point core 216 and integer core 218, however, processing unit 214 includes a number of specialized functional elements designed to more efficiently perform specialized tasks, such as a video engine 224, a crypto engine 226 and a vector engine 228.

Multi-processor system 200 schedules tasks in a flexible yet efficient manner by managing workload distribution between multiple processing units. Each processing unit has the ability to execute general purpose application instructions, however each is tuned to more efficiently execute heterogeneous workloads. Thus, any processing unit in the system can execute workloads but scheduling workloads to processing units that have similar processing characteristics results in a more efficient execution. To accomplish efficient workload scheduling, processing characteristics of an instruction set are determined and then a processing unit having similar characteristics is used to execute the instruction set. An operating system 230 has a workload scheduler 232 that discovers an instruction set's workload characteristics by initiating execution of the workload across plural heterogeneous processing units. A performance analyzer 234 analyzes performance metrics for each processing unit that are provided by a performance sensor 236 located at each processing unit. Based on the performance metrics provided from each performance sensor 236, performance analyzer 234 determines workload characteristics of the instruction set for the processing unit associated with the performance sensor 236 and stores an instruction set identifier, workload characteristic and performance metric for each instruction set and analyzed processing unit in a performance analyzer database. Based on the analysis, workload scheduler 232 schedules a preferred processing unit to execute the instructions and stores the processing unit and workload characteristics in a scheduling database 240 for use in subsequent executions of the instruction set.

In its most simple form, performance analyzer 234 compares simultaneous execution of a homogeneous instruction set at each of plural heterogeneous processing units and schedules the instruction set for execution on the processing unit that performs best. Performance sensor 236 measures performance metrics that are conventionally available in POWER architecture processors. One example of a performance metric is the average cycles per instruction (CPI) of a processing unit, which strongly correlates with power dissipation in a core and can differentiate processor bound and I/O bound applications. Another example is L1/L2/L2 cache miss rates, which strongly correlates with nest power dissipation and cache sizes and associativities. A third example of a performance metric is memory reads and writes, which correlates to nest power dissipation and cache size and associativities. A fourth example of a performance metric is prefetches and prefetch hit rates, which indicates the propensity of an application to prefetch data and the need for specialized prefetching hardware. A fifth example of a performance metric is branches and branch predictability, which correlates with power dissipation due to pipeline flushes and indicates a need for more complex branch prediction capability. A sixth example of a performance metric is I/O reads and writes, which differentiates compute bound and I/O bound applications. In addition to workload characteristics determined from performance metrics associated with execution of an instruction set, workload scheduler may also schedule based on core information from burn-in of the processing units and process technology kerf analysis, such as core frequency and cache sizes and associativities that are stored in scheduling database 240. In one embodiment, workload scheduler 232 initiates an application thread to a steady state or pre-emption and then performance metrics stored in memory accessible by operating system 230 are examined to select a processing unit for scheduling execution of subsequent instruction sets.

In one embodiment, workload scheduler 232 uses a heuristic algorithm to determine which of the processing units best matches an applications computing needs at a particular instruction set in the application's lifetime. Stored performance monitor characteristics for an instruction set allows workload scheduler 232 to select an available processing unit best matched for the instruction set. As an example, stored performance metrics for a given instruction set that indicates a large number of prefetches would result in workload scheduler 230 scheduling the instruction set for execution on processing unit 212 due to its multiple prefetch engines 220. If processing unit 212 is occupied, workload scheduler 232 can assign a different processing unit having less prefetch resources or clear processing unit 212 of its current workload. Workload scheduler 232 bases schedules in part on the priority of the instruction set so that a particular instruction set is upgraded or downgraded based on its relative priority. Other factors might also be considered, such as power consumption, processing unit availability and user preferences. One example of a workload and processing unit having similar performance characteristics is an I/O bound workload that runs on a low power simplistic general purpose processor which has a balanced distribution of functional elements. An I/O bound application spends most of its time initiating I/O transfers and waiting for those transfers to complete, such as TPC-C, ATM and database workloads. Another example of an instruction set and processing unit having matching workload characteristics is a compute intensive application and a processor having a disproportionally greater number of floating point and integer cores, such as processing unit 210. A compute intensive application has instruction sets that spend most of their time in a tight loop executing integer or floating point operations so that a processing unit with multiple execution units that are tuned for integer or floating point execution will provide enhanced performance. Another example of an instruction set and processing unit having matched workload characteristics is an application that uses branching, such as operating system instruction sets, that benefit from special prefetching algorithms and high performance compare instructions, such as are available from processing unit 212. SPECint workloads like gcc need a high branch predictability, and SPECfp CPU 2006 and STREAM applications benefit from specialized prefetch engines.

Figure 3:
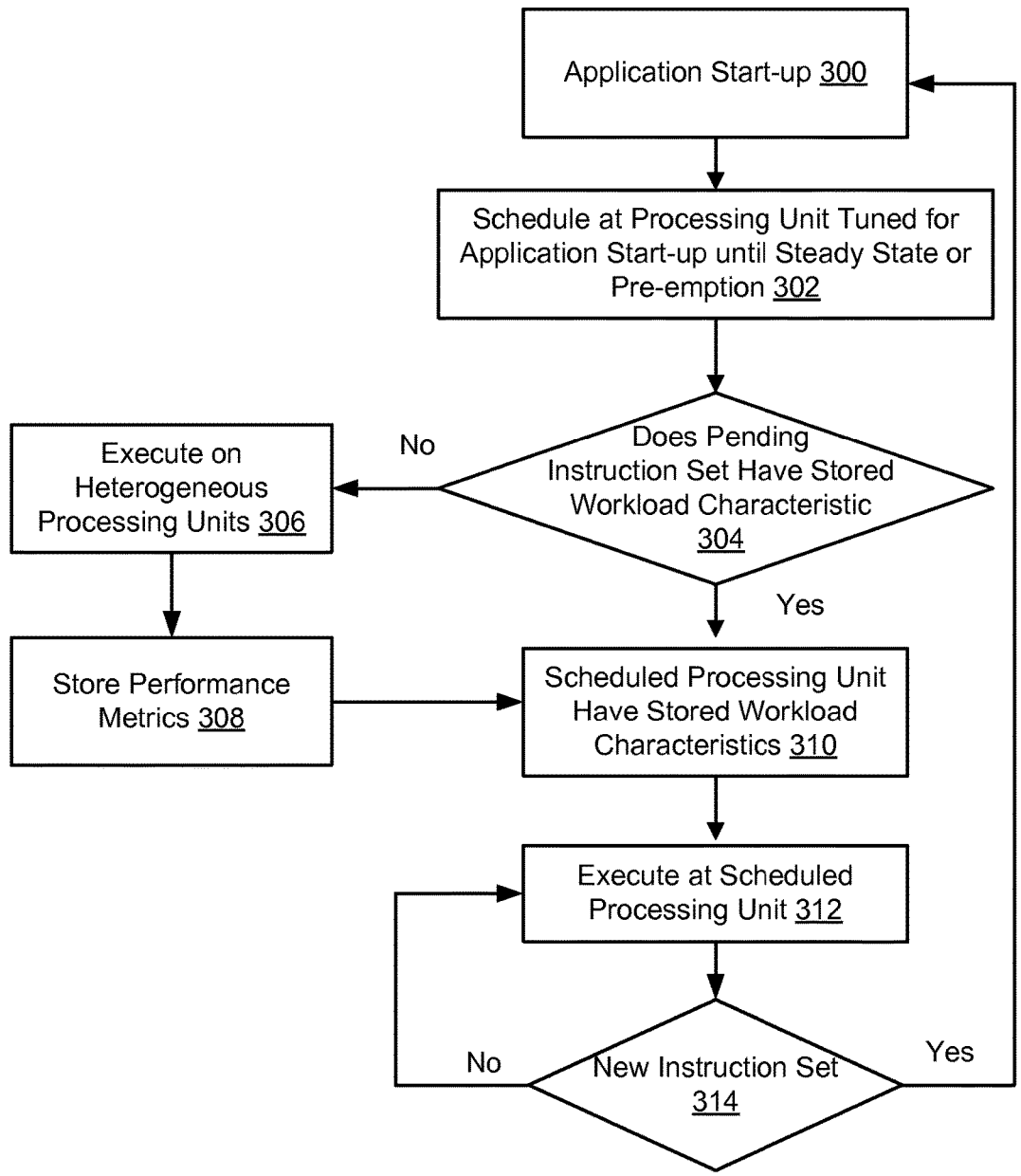
FIG. 3 shows a flow diagram of a process for matching instruction set and processing unit workload characteristics in which selected embodiments of the present invention may be implemented.

Referring now to FIG. 3, a flow diagram depicts a process for scheduling instruction sets on processing units having similar processing characteristics. The process begins at step 300 with application start-up, which executes at step 302 with a processing unit tuned for bringing an application from start-up to a steady state or to pre-emption. At step 304, a determination is made of whether a pending instruction set has a stored workload characteristic for use in assigning the instruction set to a processing unit with a similar workload characteristic. If not, the process continues to step 306 to have the instruction set execute on heterogeneous processing units and step 308 to store performance metrics from the processing units. At step 310, the instruction set is scheduled to execute on a processing unit having similar workload characteristics based on previously stored workload characteristics or newly generated workload characteristics. Where a homogeneous instruction set executes on heterogeneous processing units at step 306, step 310 may be as simple as selecting the processing unit that has best performed the instruction set. At step 312, the instruction set is scheduled to execute on the selected processing unit that has the best matched workload characteristics. At step 314, if the same instruction set continues to execute, the process returns to step 312. If at step 314 the instruction set is complete or a new instruction set is ready to execute, the process returns to step 304 to determine the processing unit that should execute the next instruction set.

Consequently, the invention is intended to be limited only by the spirit and scope of the appended claims, giving full cognizance to equivalents in all respects.

What is claimed is:

1. A method for processing information, the method comprising:
   simultaneously initiating execution of homogeneous instructions at each of plural processing units, the processing units having heterogeneous characteristics;
   monitoring one or more performance metrics associated with execution of the instructions at each of the plural processing units;
   comparing the performance metrics to determine one of the processing units having a desired performance; and
   selecting the processing unit having the desired performance to execute the instructions.

2. The method of claim 1 wherein monitoring one or more performance metrics further comprises:
   monitoring one or more performance metrics with a performance sensor built into each processing unit; and
   reporting the performance metrics to an operating system running on one or more of the processing units.

3. The method of claim 1 further comprising releasing the unselected processing units for execution of other instructions.

4. The method of claim 1 wherein each processing unit has plural cores and wherein the heterogeneous characteristics comprise different combinations of specialized cores associated with each processing unit.

5. The method of claim 4 wherein a combination of specialized cores comprises at least one processing unit having disproportionately greater number of floating point cores compared with at least one other processing unit.

6. The method of claim 4 wherein a combination of specialized cores comprises at least one processing unit having a disproportionately greater number of prefetch engines compared with at least one other processing unit.

7. The method of claim 6 wherein the homogeneous instructions comprise operating system instructions, the performance metric comprises prefetch hit rates, and selecting comprises selecting the processing unit having a disproportionately greater number of prefetch engines to execute the operating system instructions.

8. The method of claim 1 further comprising:
storing the performance metrics;
subsequently detecting execution of the instructions; and
scheduling execution of the instructions on the processing unit having the desired performance based on the stored performance metrics.

9. A method for scheduling instructions for execution by a selection of plural heterogeneous processing units, each heterogeneous processing unit having a workload processing characteristic, the method comprising:
initiating execution of homogeneous instructions simultaneously on each of plural heterogeneous processing units;
tracking one or more performance metrics at each of the plural heterogeneous processing units during the execution to determine a workload processing characteristic of the homogenous instructions;
storing workload processing characteristics of the homogeneous instructions and the processing units;
associating pending instructions with a stored workload processing characteristic; and
scheduling the pending instructions for execution on the processing unit having the workload processing characteristic.

10. The method of claim 9 wherein the heterogeneous processing units comprise a first and second processing unit having different combinations of specialized cores associated with each processing unit.

11. The method of claim 10 wherein the first processing unit has a proportionally greater number of floating point cores than the second processing unit and the second processing unit has a proportionally greater number of prefetch engines than the first processing unit.

* * * * *